United States Patent [19]

Stieber

[11] Patent Number: 4,467,197

[45] Date of Patent: Aug. 21, 1984

[54] APPARATUS FOR MONITORING THE ACCELERATION ENERGY OF AN ELECTRON ACCELERATOR

[75] Inventor: Volker Stieber, Erlangen, Fed. Rep. of Germany

[73] Assignee: Siemens Aktiengesellschaft, Berlin and Munich, Fed. Rep. of Germany

[21] Appl. No.: 394,420

[22] Filed: Jul. 1, 1982

[30] Foreign Application Priority Data

Sep. 29, 1981 [DE] Fed. Rep. of Germany ....... 3138731

[51] Int. Cl.³ .......................... H01J 1/52; H01J 47/00; G21K 1/10
[52] U.S. Cl. .................................. 250/305; 250/505.1
[58] Field of Search ............................. 250/305, 505.1

[56] References Cited

U.S. PATENT DOCUMENTS 2,485,470 10/1949 Baker .
3,179,804 4/1965 Gibney et al. .
3,477,023 11/1969 Motz .
4,184,073 12/1979 Gilbert .

OTHER PUBLICATIONS

Med. Phys. 5 (6), Nov./Dec. 1978, pp. 518–524.

Primary Examiner—Alfred E. Smith
Assistant Examiner—Jack I. Berman
Attorney, Agent, or Firm—Karl F. Milde, Jr.

[57] ABSTRACT

The apparatus contains a target exposed to a beam of accelerated electrons and an electron absorber positioned behind the target. The acceleration energy of the electron accelerator is monitored by monitoring the travelling range of the electrons in the absorber. For this purpose the electron absorber is made up of several insulated absorber portions which are arranged one behind another. Each of these portions is electrically connected to a separate input of a processing system.

The monitoring apparatus is especially well suited for application in electron accelerators in medical radiation therapy, such as linear accelerators.

17 Claims, 7 Drawing Figures

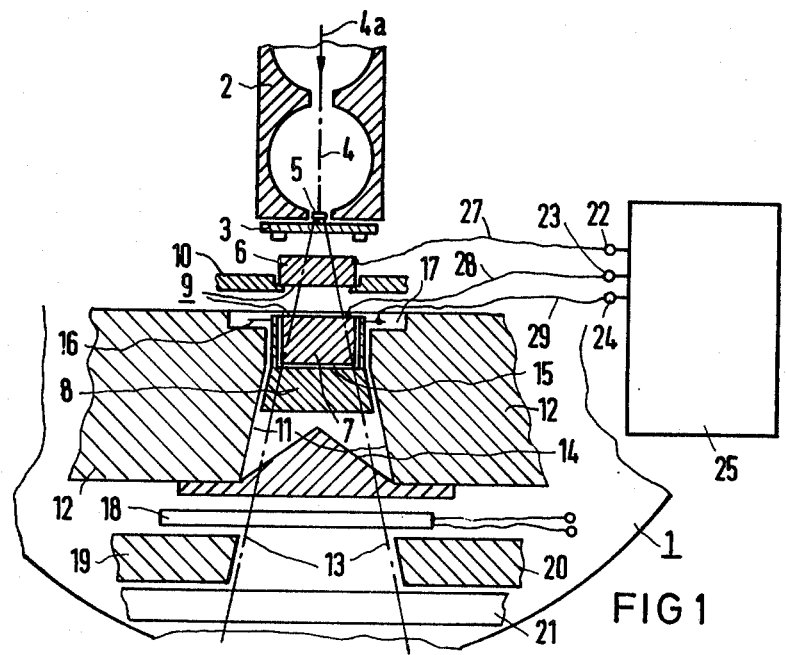
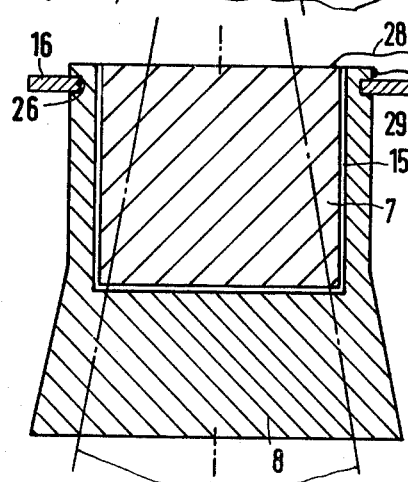
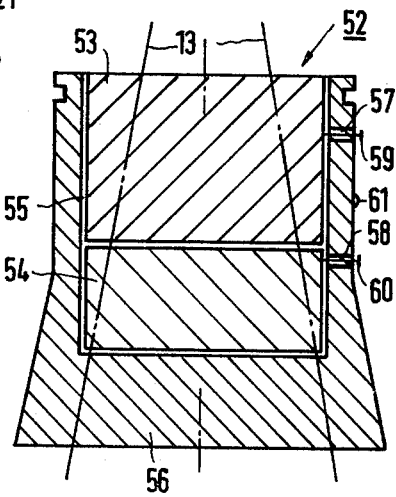
FIG 1
FIG 2
FIG 5

APPARATUS FOR MONITORING THE ACCELERATION ENERGY OF AN ELECTRON ACCELERATOR

BACKGROUND OF THE INVENTION

1. Field of the Invention

This invention relates to an apparatus for monitoring the acceleration energy of an electron accelerator. In the accelerator a target is to be exposed to a beam of accelerated electrons, and an electron absorber is positioned behind the target. In particular, this invention relates to a monitoring apparatus for a linear accelerator applicable to the irradiation of patients.

2. Description of the Prior Art

With electron accelerators having a target exposed to the electron beam for the purpose of production of X-ray radiation, it is customary to measure the intensity of the emitted X-ray radiation with an ionization chamber positioned in the radiation path. The measuring signal of the ionization chamber is primarily dependent on the number of X-ray quanta which impinge into the measuring volume per time interval, and in much smaller degree, the measuring signal is also dependent on the energy of the X-ray quanta. The interaction of the X-rays with the gas of the ionization chamber increases as the quantum energy decreases. Given an unchanged number of X-ray quanta per time unit, dependency results in a small decrease of the measuring signal when the energy increases. Knowing the energy of the X-ray quanta or the energy of the electrons impinging on the target, it would be possible to assign the output signal of the ionization chamber to a definite number of X-ray quanta per time unit and volume unit. In medical applications, it is especially significant that as the quanta energy decreases, the interaction of the X-ray radiation with the body of the patient increases. Therefore, from the therapeutical aspect, the determination of the energy of the X-ray quanta, that is, of the hardness of penetrability of the X-ray radiation, is of special interest.

In electron accelerators having a target exposed to the electron beam for producing X-ray radiation, an electron absorber is conventionally located in the radiation path behind the target. The electron absorber consists of a material having an atomic number distinctly lower than that of the target, as for example, copper, aluminum, graphite. The electrons penetrating the target are absorbed in the electron absorber, without being able to produce afocal X-ray radiation. Behind the electron absorber, the X-ray radiation cone is free of electron radiation.

In electron accelerators it is also well known to build in the target in an electrically insulated way and to connect it to ground through a resistor. This has the advantage that in an inspection check of the accelerator, the charging curve of a target during a beam pulse can be recorded on a cathode ray tube. From the shape of the charging curve one can determine certain adjustment and tuning errors of the electron accelerator.

SUMMARY OF THE INVENTION

1. Objects

It is an object of this invention to provide an apparatus for measuring the acceleration energy of an electron accelerator.

It is another object of this invention to provide an apparatus for monitoring the X-ray energy of an electron accelerator, in particular, of a pulsed linear accelerator.

It is still another object of this invention to provide such a monitoring apparatus which is sufficiently sensitive to detect even minor variations of the acceleration energy and thereby of the medically relevant hardness or penetrability of the generated X-ray radiation.

2. Summary

According to this invention, an electron accelerator contains a target to be exposed to a beam of accelerated electrons for the emission of X-rays. The accelerator also contains an electron absorber positioned in the radiation path behind the target. This electron absorber is a part of an apparatus for monitoring the acceleration energy of the electron accelerator. The entire electron absorber is divided into several absorber portions which are insulated from each other. Each of these portions is individually electrically connected to an input of a processing system.

This design is based on the recognition that the travelling range of electrons in a medium is proportional to the kinetic energy of the electrons. In a monochromatic electron beam the intensity (number of electrons) of the electron beam drops steeply to zero after the electrons have passed through a length which is proportional to their kinetic energy. Thus, nearly the total electric charge of the electron beam is released in the material of the electron absorber in the region up to the range end of the electron beam. By providing an electron absorber which contains several insulated absorber portions, the position of that absorber portion which produces the largest charge pulse can be determined in the processing system. From this, the travelling range and the energy of the electrons can be determined.

In another embodiment of the invention which relates to a pulsed accelerator the electron absorber consists of a material having an electrical conductivity which provides for a complete discharging within two successive charging pulses. A sufficient electrical conductivity and a sufficiently quick charge transport in the absorber portions of the electron absorber are required in order to monitor continuously the acceleration energy during the operation of the accelerator.

In another embodiment of the invention, the electron absorber consists of three portions which (viewed in the direction of the beam) have approximately equal lengths. By such a three-fold division of the absorber, the costs of construction regarding the processing system connected thereto are limited. At the same time a sufficiently high measurement accuracy for most purposes is attained in the determination of the acceleration energy.

According to another embodiment of the invention, the measurement accuracy can be appreciably improved if adjacent surfaces of the individual portions of the electron absorber viewed in the direction of the beam are positioned at a depth of the absorber material which is equal to the depth of penetration of the electrons having the monitored acceleration energy. Given such dimensioning, minor changes of the travelling range of electrons produce major changes of the signal amplitude.

In another embodiment of the invention the target can be supported in an insulated manner, and it can be electrically connected to a separate input of the processing system. Thereby one obtains further data which are especially essential in the optimization of the acceleration parameters.

Also according to another embodiment of the invention, the portions of the electron absorber are mounted at a distance from each other.

Further according to another embodiment of the invention, the portions of the electron absorber are insulated from each other by an intermediate layer and placed flush next to each other, wherein said insulating intermediate layer comprises a lacquer type coating.

According to still another embodiment of the invention, the measurement accuracy can be further improved, if the processing system forms the difference or the quotient of the electrical charges accumulated during each beam pulse on the individual portions of the electron absorber. The difference and also the quotient of the signal amplitudes which are supplied by the absorber portions of the electron absorber that are positioned one behind the other, vary markedly with the acceleration energy. At the same time, they are widely independent of the total number of the accelerated electrons.

In an especially efficient embodiment of the invention, the processing system can form the difference or the quotient of the electric charges accumulated during each beam pulse at two adjacent portions of the electron absorber. The corresponding signal amplitudes are produced by two adjacent absorber portions that lie in the region of the range end of the electrons in the electron absorber. It is this difference or this quotient of signal amplitudes which at minor changes in the acceleration energy experiences large changes. Therefore, the difference or quotient is the suitable monitoring parameter for the acceleration energy of electrons and for the hardness or penetrability of X-ray radiation.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings

FIG. 1 is a cross section of a radiation head of an electron accelerator incorporating a monitoring apparatus according to the invention;

FIG. 2 is an enlarged representation of two electron absorber portions which are inserted in the protective housing of the electron accelerator according to FIG. 1;

FIG. 5 is an enlarged representation of an electron absorber comprising various absorber portions, three of which are inserted in the protective housing of the electron accelerator according to FIG. 1;

DETAILED DESCRIPTION OF THE PREFERRED EMBODIMENTS

Figure 3:
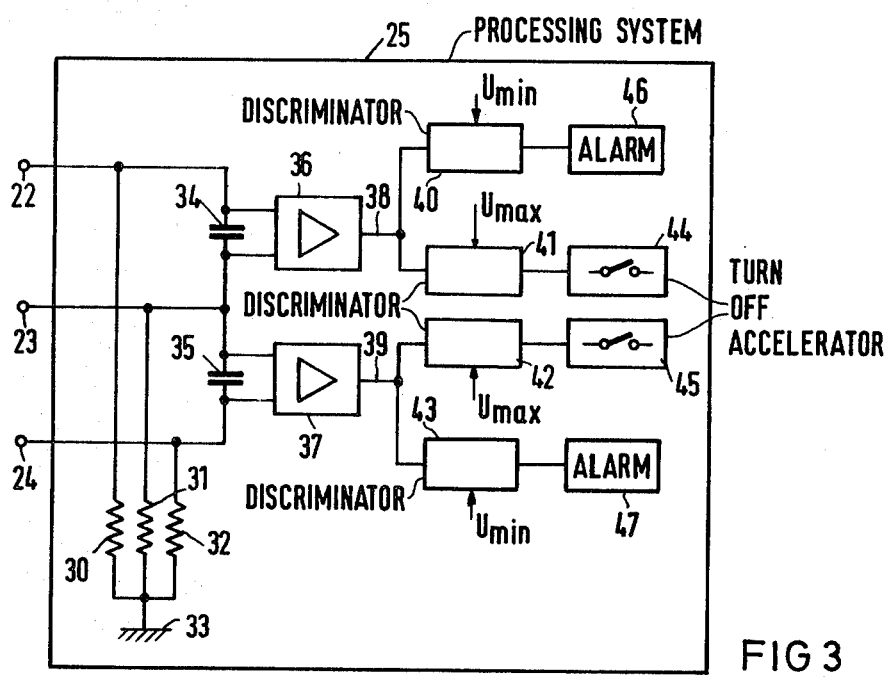
FIG. 3 is an electric circuit which may be used as a processing system in conjunction with the monitoring device according to the invention.

In a simplified representation, FIG. 1 illustrates the construction of a radiation head 1 of an electron accelerator, in particular of a linear accelerator. The output side of the acceleration tube 2 is sealed in an air tight manner by an exit window 3. For the sake of clarity, the exit window 3 is shown in some distance from the output end of the tube 2. In reality, it is flange-connected therewith. The beam exit window 3 bears on its inner side a target 5 which is exposed to the electron beam 4. The beam direction is denoted by an arrow 4a. Electrons accelerated in the tube 2 generate X-rays in the target 5. In beam direction behind the beam exit window 3 of the acceleration tube 2, an electron absorber 9 is disposed. The electron absorber 9 of this embodiment comprises three portions 6, 7, 8. The first absorber portion 6 is supported by a separate supporting member 10. In beam direction behind the first absorber portion 6 of the electron absorber 9, the cone shaped transmission channel or exit opening 11 of the protective screen housing 12 of the accelerator is arranged. The width of the exit opening 11 is fitted to that beam cone 13 which is maximally screenable.

At the exit opening 11 of the protective housing 12, a compensating body 14 for X-ray radiation is secured. A cone-shaped portion of the compensating body 14 reaches into the opening 11. In beam direction in front of the compensating body 14, the second and third portions 7, 8 of the electron absorber 9 are secured in the cone-shaped exit opening 11 of the protective housing 12.

The third absorber portion 8 supports the second absorber portion 7 in a recess 15. The third portion 8 of the electron absorber 9 is held in place by a snap ring 16 (see FIG. 2) which is supported by a recess 17 provided in the upper side of the protective housing 12.

In beam direction behind the protective housing 12 and behind the compensating body 14 attached to the protective screen housing, there is provided an ionization chamber 18. In beam direction behind the ionization chamber 18 there are provided three adjustable shutter or screening plates 19, 20, 21 of a radiation diaphragm. These plates 19, 20, 21 are used to narrow the beam cone 13.

Each of the three portions 6, 7 and 8 of the electron absorber 9 is supported in an insulated manner and connected to an input 22, 23 and 24, respectively, of a processing system 25. Details of the processing system 25 are shown in FIG. 3.

FIG. 2 shows in an enlarged representation the second and third portions 7 and 8 of the electron absorber 9, which portions 7 and 8 are arranged in the protective housing 12. The third portion 8 of the electron absorber 9 in its external dimensions is fitted exactly to the inside width of the exit opening 11 provided in the protective housing 12. On its side next to the target 5, the third portion 8 contains a bore or recess 15. The second portion 7 of the electron absorber 9 fits in this recess 15.

In the upper part of the third absorber portion 8 of the electron absorber 9, that is, next to the target 5, a notch 26 for receiving the snap ring 16 is provided. This notch 26 goes all around the third portion 8.

All three portions 6, 7, 8 of the electron absorber 9 are preferably made of aluminum and eloxated. The eloxation layers insulate them from each other. The portions 7 and 8 may be placed flush next to each other. The portions 6, 7, 8 are electrically connected to the inputs 22, 23, 24, respectively, of the processing system 25 by means of leads or cables 27, 28 and 29, respectively.

FIG. 3 illustrates the internal configuration of an embodiment of the processing system 25 shown in FIG. 1. The processing system 25 is part of the energy monitoring apparatus. All three inputs 22, 23, and 24 (to which the individual portions 6, 7, 8 of the electron absorber 9 are electrically connected) are connected to ground 33 through high resistance resistors 30, 31 and 32, respectively. The leads 27 and 28 of the first and second portions 6 and 7, respectively, of the electron absorber 9 are connected to the electrodes of a first capacitor 34. Correspondingly, the leads 28 and 29 of the second and third portions 7 and 8, respectively, are connected to the electrodes of a second capacitor 35. The capacitors 34 and 35 are series-connected. Amplifiers 36 and 37 are connected in parallel to each of the capacitors 34 and 35, respectively. Each output 38, 39 of the amplifiers 36, 37 is connected to two preset discriminators 40, 41 and 42, 43, respectively. One of the two discriminators assigned to each amplifier 36, 37 is operative and renders an output signal only when a preset minimum voltage is exceeded. These discriminators are the discriminators 40 and 43, and the minimum voltage is termed $U_{min}$. The other one of the two discriminators assigned to each amplifier 36, 37 is operative and issues an output signal only when a preset maximum voltage is not exceeded. These discriminators are the discriminators 41 and 42, and the maximum voltage is termed $U_{max}$. The discriminators 41, 42 to which the maximum value $U_{max}$ has been assigned, are connected to switching devices 44, 45, respectively, for turning off the linear accelerator (energy interlock). The discriminators 40, 43 to which the minimum value $U_{min}$ has been assigned, are connected to alarm-causing devices 46, 47, respectively.

During operation of the electron accelerator, a pulsating electron beam 4 impinges in the vacuum of the acceleration tube 2 directly on the target 5 and produces Bremsstrahlung or (continuous) X-rays. The target 5 comprises a material having high atomic number, good heat conductivity and a high melting point, such as gold, platinum or tungsten. The target 5 is directly brazed to the radiation exit window 2 which is directly attached to the acceleration tube 2. The radiation exit window 3 forms an air tight seal for the acceleration tube 2 and at the same time it conducts the heat away which is produced at the target 5.

Even if the thickness of the target 5 is optimally fitted to the electrons, the radiation cone 13 leaving the target 5 contains, aside from the X-ray radiation, a considerable amount of electrons. These electrons, which have substantially less depth of penetration than X-ray radiation, can result in an undesirably high radiation load on the surface of the object or patient to be treated. They are filtered out of the radiation cone 13 by the electron absorber 9 which is positioned behind the target 5. In order that no afocal X-ray quanta are additionally produced in the electron absorber 9, the portions 6, 7, 8 of the electron absorber 9 consist of a meterial or of various materials having a considerably lower atomic number than the target 5. Preferred materials for the electron absorber 9 are e.g., copper, aluminum or graphite. The absorber portions 6, 7, 8 may have atomic numbers that increase in the direction 4a of the radiation. In particular, the first absorber portion 6 may consist of graphite.

The electrons (which are undesired for radiation treatments) are absorbed in the electron absorber 9 at the end of their energy dependent range. That is, they are captured by the material of the electron absorber 9, and they charge the absorber 9 to become electrically negative with respect to its surroundings. After penetration of the electron absorber 9, the radiation cone 13 is basically or even entirely free of electrons.

The electric charges which accumulate during each of the beam pulses in each absorber portion, that is the electrons which remain in the individual portions, are conducted via the inputs 22, 23, 24 and the leakage resistors 30, 31, 32 of the processing system 25 to ground 33. Thereby, the capacitor 34, 34 which is located between two neighboring inputs 22, 23, 24 is charged in proportion to the difference of charges accumulated in two neighboring absorber portions 6, 7, 8.

Figure 4:
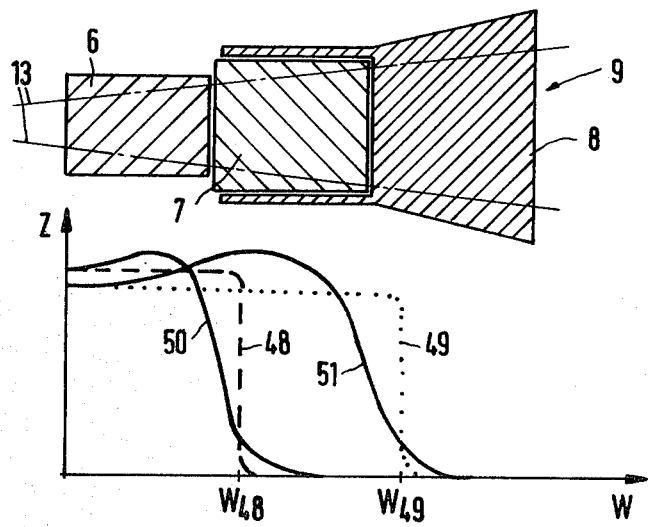
FIG. 4 is a diagram depicting the range of electrons in an electron absorber consisting of three absorber portions in dependence on the acceleration energy.

From FIG. 4 the travelling range of electrons in a homogeneous material in dependence of their primary energy can be depicted. On the ordinate of the diagram is plotted the number Z of electrons in an electron beam, and on the abscissa is plotted in the path W travelled in the uniform material of the electron absorber. Above the diagram, there are shown the three portions 6, 7 and 8 of the electron absorber 9.

The dashed curve 48 and the dotted curve 49 both apply to monochromatic electron radiation. The energy of the electrons relating to the dotted curve 49 is greater than the energy of the electrons relating to the dashed curve 48. Both curves 48 and 49 show that the electrons in the homogeneous material of the electron absorber 9 have a very definite travelling range $W_{48}$ and $W_{49}$, respectively, which is a function of their energy. After passing through this range $W_{48}$, $W_{49}$, the electrons have consumed their energy and remain in the electron absorber. Consequently, the number of electrons of the electron beam subsequently drops steeply back to zero.

In the present case of a linear accelerator, however, one is not dealing with an electron beam having electrons of the same energy, since a portion of the electrons has already given off a part of their energy in the target 5 during the production of X-ray Bremsstrahlung (continuous radiation). The distribution of the electron energies results in the intensity of the electron beam dropping less steeply than in the curves 48, 49 and more gradually, as shown in solid curves 50 and 51 which refer to two different acceleration energies. Furthermore, in the electron absorber 9 additional electrons are released by the X-ray radiation, so that at the beginning or in the middle portion of the decelerating path a slight rise in the number of electrons in the beam cone 13 can be observed. The derivative of the solid curves 50 and 51 corresponds or is proportional to the number of the electrons absorbed at the given location. The electrons which are absorbed in the individual portions 6, 7, and 8 of the electron absorber 9 correspond to those electrons which have been slowed down to zero in these portions.

In FIG. 4 one can see that right at the end of the travelling range curves of the electrons strong intensity changes are connected with changes of the electron energy. In order to illustrate how this effect is taken into consideration in a divided absorber, in FIG. 4 the positions of the three portions 6, 7 and 8 of the electron absorber 9 are shown over the solid range curves 50 and 51. This illustration makes clear that the edges of the individual absorber portions 6, 7 and 8 of the electron absorber 9 should be placed at places where the steepest decrease in the number of electrons in the beam cone 13 will occur at acceleration energies which have to be kept in normal operation. The threefold divided electron absorber 9 of FIGS. 1, 2 and 4 is therefore especially suited for an electron accelerator having two operationally adjustable acceleration energies (see curves 50 and 51).

FIG. 5 shows a part of another embodiment of an electron absorber 52. This electron absorber 52 is comprised of four absorber portions and is preferably suitable for an electron accelerator having three acceleration energies which are adjustable for operation. The first portion (not shown) of the electron absorber 52 may be identical to the first portion 6 of the electron absorber 9 shown in FIG. 1. The second, third and fourth portions are referred to as 53, 54 and 56, respectively. The second and third portions 53 and 54 preferably have a cylindrical shape. They are placed above each other in the borehole or cylindrical recess 55 provided in the fourth portion 56 which (seen in beam direction) is the last absorber portion.

This last or fourth portion 56 of the electron absorber 52 is very similar to the third portion 8 of the electron absorber 9 shown in FIG. 2 except for its somewhat deeper borehole 55. Of special notice is that the fourth portion 56 has outer dimensions which are the same as the inner dimensions of the exit opening 11 provided in the protective housing 12. At the edge of the fourth portion 56, two boreholes 57 and 58 are provided. Connectors 59 and 60, respectively, are inserted through these boreholes 57, 58 into the respective absorber portions 53 and 54 which in turn rest within the recess 55. The fourth portion 56 has also attached thereto such a connector 61. Via the connectors 59, 60 and 62, an electric connection to the inputs 78, 79, 80 of a processing system 77 can be made, see FIG. 7. It must be made sure that the individual absorber portions 53, 54, 56 and the connectors 59, 58, 61 are insulated from each other.

If need be, it is possible to divide the electron absorber into more than four disk-shaped portions. Yet, expenditures for the processing system would increase accordingly, and additional inputs would be required in the processing system.

Figure 6:
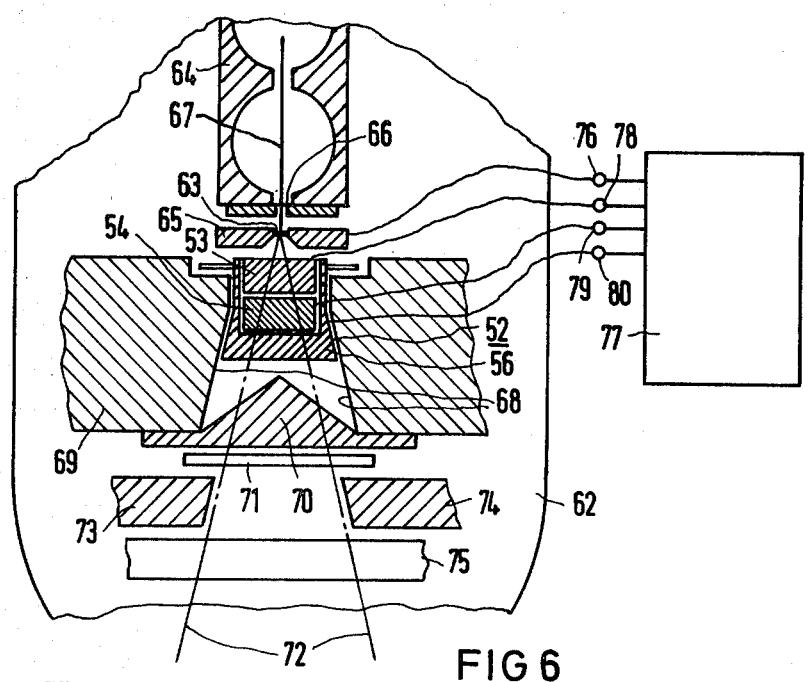
FIG. 6 is a cross section of a radiation head of an electron accelerator having a target arranged in an isolated manner, said accelerator incorporating a monitoring apparatus according to the invention.

FIG. 6 shows the structure of the beam head 62 of another electron accelerator. This beam head 62 has the target 63 mounted in a separate holder or frame 65 outside of the acceleration tube 64. The acceleration tube 64 is sealed in a vacuum tight manner by a thin exit window 66 which is flanged on and is easily permeable by electrons. The target 63 is exposed to the electron beam 67 which exits out of the beam exit window 66. In beam direction behind the target 63, the cone-shaped exit opening 68 of the radiation protective housing 69 is provided. Into this opening 68, the three portions 53, 54 and 56 of the electron absorber 52 of FIG. 5 are inserted. In the present case, the electron absorber again has only three absorber portions. In beam direction behind the electron absorber 53, 54, 56, there is a compensation body 70 attached to the radiation protective housing 69. In beam direction behind that, there are located an ionization chamber 71 as well as several diaphragm plates 73, 74, 75 of the primary diaphragm which limits the beam cone 72.

In the embodiment of FIG. 6, the target 63 is supported by the frame 65 in an electrically insulating manner. It is electrically connected to a separate input 76 of a processing system 77. To the three remaining inputs 78, 79, 80 of this processing system 77 are connected the three portions 53, 54, 56 of the electron absorber 52. The processing system 77, except for an extension by one input, is constructed similar to the one which was described in connection with FIG. 3. The target 63 which (instead of the first portion 6 of the electron absorber of FIG. 1) is connected to the processing system 77, here assumes the same function as the first absorber portion 6. Due to the lesser thickness of the target 63, only electrons of low energy can be absorbed therein. Thus, the current which is collected from the target 63 is a measure of the amount of low energy electrons in the primary electron beam 67. Therefore, this current is especially significant for optimizing the acceleration parameters of the accelerator.

Using this type of signal processing, the signal of the amplifiers 36, 37 remain widely independent of the absolute number of electrons per time unit. However, the signal at the output of the amplifiers 36, 37 is strongly dependent on the positions of the ends of the electron energy range curves. That is, the output signal is dependent from the energy of the electrons. At the discriminators 40, 41 and 42, 43 which are arranged behind the amplifiers 36 and 37, respectively, a desired maximum value $U_{max}$ of the amplifier input voltage as well as a desired minimal value $U_{min}$ can be set.

The output signal of the discriminators 40-43 can be used to turn off the electron accelerator and also to release an alarm.

Figure 7:
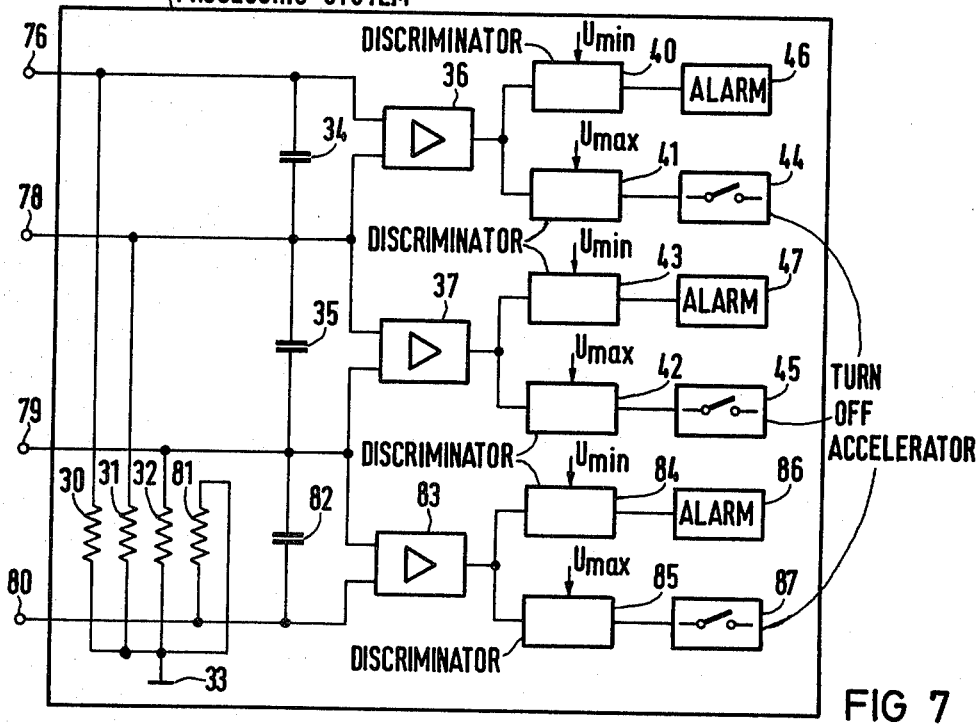
FIG. 7 is another processing system which may be used in conjunction with the monitoring device illustrated in FIG. 6.

In FIG. 7, details of the processing system 77 are illustrated. It will be noted that this system 77 basically corresponds to the processing system 25 disclosed in FIG. 3. It will also be noted that due to a fourth input (see input 80), another stage has been added. This third stage comprises a resistor 81, a capacitor 82, an amplifier 83, two discriminators 84 and 85 having a preset minimum value and a preset maximum value, respectively, an alarm device 86 and a switching device 87 for turning off the accelerator. The electrical connections of these elements 81-87 and their function are the same as in the first and second stage of the system 25 described with respect to FIG. 3.

While the apparatus for monitoring the acceleration energy of an electron accelerator herein described constitutes preferred embodiments of the invention, it is to be understood that the invention is not limited to these precise forms of assembly, and that a variety of changes may be made therein without departing from the scope of the invention.

What is claimed is:

1. In an apparatus for monitoring the acceleration energy of an electron accelerator, having a target to be exposed to a beam of accelerated electrons and an electron absorber positioned behind said target, the improvement wherein said electron absorber comprises a plurality of absorber portions which are insulated from each other, and a processing system, and wherein each of said absorber portions is electrically connected to an input of said processing system.

2. The improvement according to claim 1, wherein said accelerator is designed to deliver a plurality of successive electron radiation pulses, wherein resistors are provided for connecting said absorber portions to a common point, and wherein said electron absorber portions are comprised of a material having an electric conductivity which provides for a complete charge equalization within two successive radiation pulses.

3. The improvement according to claim 1, wherein said electron absorber comprises three absorber portions which, viewed in the direction of said beam, approximately have the same thickness.

4. The improvement according to claim 1, wherein the adjacent surfaces of two of said portions of said electron absorber are positioned at a location which is approximately equal to the depth of penetration of said accelerated electrons having said acceleration energy to be monitored.

5. The improvement according to claim 1, wherein said target is supported in an insulated manner and is connected to a separate input of said processing system.

6. The improvement according to claim 1, wherein said accelerator is designed to deliver a plurality of successive electron radiation pulses, and wherein said processing system forms the difference of the accumulated electrical charges caused by each beam pulse on said individual portions of said electron absorber.

7. The improvement according to claim 1, wherein said accelerator is designed to deliver a plurality of successive electron radiation pulses, wherein said target is connected to a separate input of said processing system, and wherein said processing system forms the difference of the accumulated electrical charges caused by each beam pulse on one of said portions of said electron absorber and on said target.

8. The improvement according to claim 1, wherein said accelerator is designed to deliver a plurality of successive electron radiation pulses, and wherein said processing system forms the difference of the accumulated electric charges caused by each beam pulse on two adjacent portions of said electron absorber.

9. The improvement according to claim 6, 7 or 8 wherein said processing system comprises means for turning off the electron accelerator as soon as said difference exceeds a predetermined maximum value.

10. The improvement according to claim 6, 7 or 8 wherein said processing system comprises means for giving an alarm as soon as said difference falls below a predetermined minimum value.

11. The improvement according to claim 1, wherein said portions of said electron absorber are mounted at a distance from each other.

12. The improvement according to claim 1, wherein said portions of said electron absorber are insulated from each other by an intermediate layer and placed flush next to each other.

13. The improvement according to claim 1, wherein said electron absorber comprises a material having an atomic number which is not higher than that of copper.

14. The improvement according to claim 1, wherein the absorber next to said target comprises graphite.

15. The improvement according to claim 1, wherein said electron absorber comprises aluminum.

16. The improvement according to claim 12, wherein said electron absorber comprises aluminum, and wherein said intermediate layer is an eloxation layer.

17. The improvement according to claim 12, wherein said insulating intermediate layer comprises a lacquer type coating.

* * * * *